No. 752,562. Patented February 16, 1904.

UNITED STATES PATENT OFFICE.

PAUL JULIUS, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION, OF BADEN, GERMANY.

RED AZO DYE.

SPECIFICATION forming part of Letters Patent No. 752,562, dated February 16, 1904.

Application filed March 4, 1902. Serial No. 96,623. (Specimens.)

*To all whom it may concern:*

Be it known that I, PAUL JULIUS, doctor of philosophy and chemist, a subject of the Emperor of Austria-Hungary, residing at Ludwigshafen-on-the-Rhine, in the Kingdom of Bavaria, Germany, have invented new and useful Improvements in New Azo Coloring-Matter, of which the following is a specification.

This invention relates to a new coloring-matter which can be prepared from diazotized sulfo-acid of para-chlor-anilin (which generic term includes both 4-chlor-anilin-5-sulfo-acid and 4-chlor-anilin-6-sulfo-acid) and beta-naphthol.

This new coloring-matter possesses the property of yielding products which are quite insoluble in water or ethyl-alcohol when suitably treated with lead acetate, barium chlorid, alumina hydrate, or calcium chlorid.

This coloring-matter may be obtained by diazotizing one (1) molecular proportion of sulfo-acid of para-chlor-anilin in the way well known to chemists and combining this product with one (1) molecular proportion of beta-naphthol in the presence of caustic soda, as is usual in the art and is well known to chemists.

The coloring-matter is difficultly soluble in cold water. With hot water it gives a red solution, which on treatment with caustic soda turns to brown red. The coloring-matter produces a red color with a bluish cast on treatment with concentrated sulfuric acid, which on dilution with water changes to a red with a yellow cast.

On suitable treatment of this coloring-matter with stannous chlorid and hydrochloric acid alpha-amido-beta-naphthol and para-chlor-anilin sulfo-acid are produced and may be identified by the tests usual for such purpose.

What is claimed is—

1. As a new article of manufacture azo coloring-matter which can be derived from sulfo-acid of para-chlor-anilin and beta-naphthol, and which on suitable treatment with stannous chlorid and hydrochloric acid yields alpha-amido-beta-naphthol, and sulfo-acid of para-chlor-anilin.

2. As a new article of manufacture azo coloring-matter which can be derived from 4-chlor-anilin-5-sulfo-acid and beta-naphthol, and which on suitable treatment with stannous chlorid and hydrochloric acid yields 4-chlor-anilin-5-sulfo-acid and alpha-amido-beta-naphthol.

In testimony whereof I have hereunto set my hand in the presence of two subscribing witnesses.

PAUL JULIUS.

Witnesses:
JOHN L. HEINKE,
JACOB ADRIAN.